United States Patent [19]

Sitterle

[11] Patent Number: 4,573,774
[45] Date of Patent: * Mar. 4, 1986

[54] SOFT TORIC CONTACT LENS

[75] Inventor: George Sitterle, Jacksonville, Fla.

[73] Assignee: Vistakon, Inc., Jacksonville, Fla.

[ * ] Notice: The portion of the term of this patent subsequent to Apr. 2, 2002 has been disclaimed.

[21] Appl. No.: 703,010

[22] Filed: Feb. 19, 1985

Related U.S. Application Data

[63] Continuation-in-part of Ser. No. 306,438, Sep. 28, 1981, Pat. No. 4,508,436.

[51] Int. Cl.⁴ ............................................. G02C 7/04
[52] U.S. Cl. ............................. 351/160 H; 351/161; 351/176
[58] Field of Search ............... 351/160 R, 160 H, 161, 351/162

[56] References Cited

U.S. PATENT DOCUMENTS

| | | | |
|---|---|---|---|
| 4,095,878 | 6/1978 | Fanti | 351/161 |
| 4,324,461 | 4/1982 | Salvatori | 351/161 X |

FOREIGN PATENT DOCUMENTS

| | | | |
|---|---|---|---|
| 2340560 | 2/1977 | France | 351/161 |
| 2033101 | 5/1980 | United Kingdom | 351/161 |
| 2041557 | 9/1980 | United Kingdom | 351/161 |

OTHER PUBLICATIONS

"Correcting Astigmatism with the Hydron ® Toric Hydrophilic Contact Lens", Alan J. Touch, 20/20, Jul./Aug., 1979.

Primary Examiner—John K. Corbin
Assistant Examiner—Scott J. Sugarman
Attorney, Agent, or Firm—Wayne R. Eberhardt

[57] ABSTRACT

A soft toric contact lens having spherocylindrical power for correcting astigmatism in humans and utilizing a prism ballast as a means of maintaining correct axial orientation. The degree of prism is greater than about 0.5 diopter, and the peripheral outer surface of the lens is tapered off to a relatively thin edge of constant thickness over a substantial portion of the ballast area.

8 Claims, 6 Drawing Figures

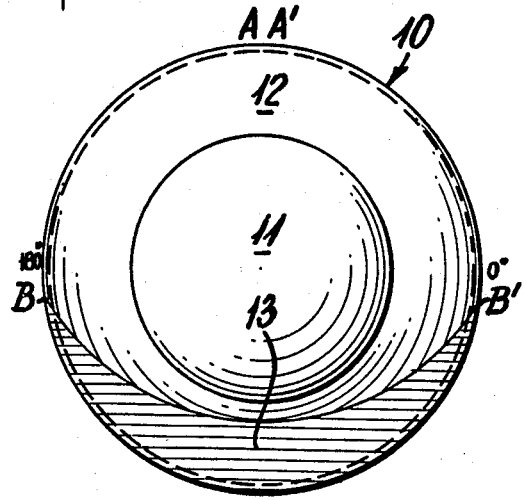
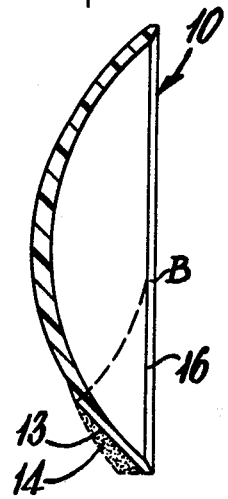
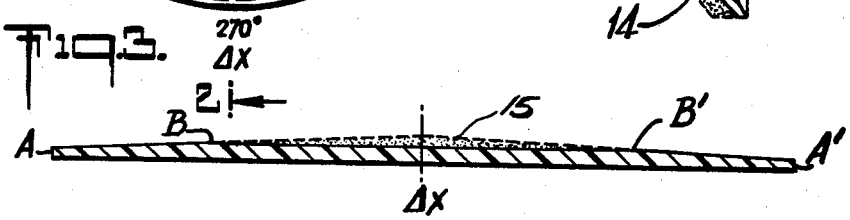
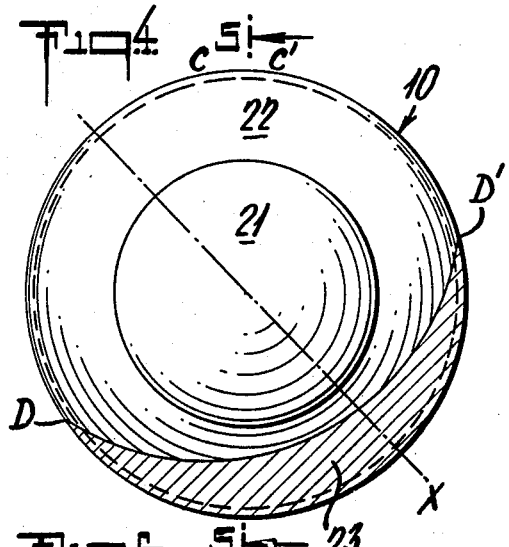
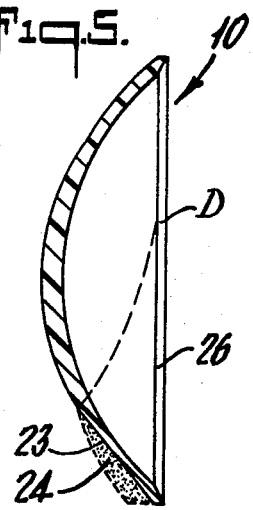
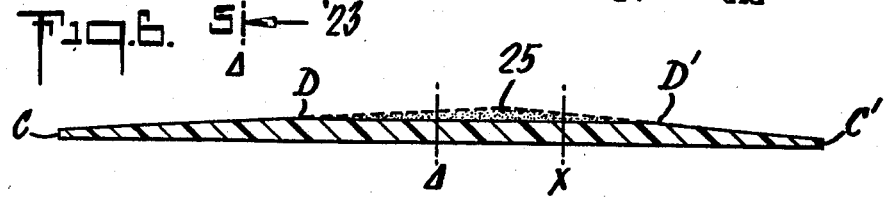

SOFT TORIC CONTACT LENS

This application is a continuation-in-part of application Ser. No. 306,438 filed Sept. 28, 1981, now U.S. Pat. No. 4,508,436.

BACKGROUND OF THE INVENTION

1. Field of the Invention

This invention relates to contact lenses, and more particularly, to soft contact lenses of the toric type designed to correct astigmatism in humans.

2. Description of Prior Art

A toric lens has both spherical and cylinder correction and accordingly must maintain a fixed and predetermined orientation during use. A normal spherical lens tends to rotate in the eye as it floats on tears and is subject to normal blinking and eye movement. The problem of preventing rotation of a toric lens has been addressed in several ways.

A prism ballast has been used in soft contact lenses to provide orientation by gravitational forces, but the greater thickness of the lens over the area of maximum ballast, and particularly the thickness of the edge of the lens, has resulted in patient discomfort. To allievate this problem, the degree of prism has generally been limited to a maximum of from about 0.75 to 1.0 diopters. With lower prism values, the lens is often additionally truncated at the prism base since the ballast alone is insufficient to assure proper orientation. It has also been suggested to chamfer the edge of the lens over the area of the prism base to improve patient comfort. These modifications of the lens have not proved to be entirely satisfactory.

U.S. Pat. No. 4,095,878 discloses a method for assuring axial orientation in which a soft contact lens having a relatively thick edge is flattened along a portion of its peripheral region in the 12 o'clock and 6 o'clock positions so that the thickness of the edges in these regions is less than the thickness in the regions of 9 o'clock and 3 o'clock. Because the relatively thick edges remaining in the 9 o'clock and 3 o'clock positions may still cause discomfort to the wearer, it is suggested to taper off these regions to a limited degree. The technique proposed by this reference has not proved to be entirely satisfactory.

It is accordingly an object of the present invention to provide a soft toric contact lens with a spherocylindrical power to correct astigmatism. It is a further object of this invention to provide a soft toric contact lens using a prism ballast to maintain axial orientation. It is a yet further object of this invention to provide a soft toric contact lens of improved design for increased user comfort. These and other objects of the invention will be apparent from the ensuing description and claims.

SUMMARY

A soft toric contact lens of the present invention is provided with either an inner or outer toric surface, with the desired spherocylindrical power and appropriate axis to correct astigmatism, and with a prism ballast to maintain the correct axial orientation during use. The degree of prism is greater than about 0.5 diopter, and most preferably is from about 1.0 to 1.5 diopters. The outer surface of the lens has a central optical zone and a peripheral lenticular zone, and a significant portion of the lenticular zone over the area of the prism base is tapered off to provide a thin and uniform edge thickness over the entire tapered region. The resulting lens maintains correct orientation during use and provides improved comfort to the user.

DESCRIPTION OF DRAWINGS

FIG. 1 is a plan view of a soft toric contact lens having a cylindrical axis of 90 degrees.

FIG. 2 is a diagrammatic cross section of the lens of FIG. 1 along line 2—2.

FIG. 3 is an edge thickness profile of the lens of FIG. 1.

FIG. 4 is a plan view of a soft toric contact lens having a cylindrical axis of 45 degrees.

FIG. 5 is a diagrammatic cross section of the lens of FIG. 4 along line 5—5.

FIG. 6 is an edge thickness profile of the lens of FIG. 4.

DESCRIPTION OF PREFERRED EMBODIMENT

The soft toric contact lenses of the present invention are preferably composed of a hydrophilic polymer and manufactured by lathe cutting a dehydrated polymer button to the desired lens shape, thereafter hydrating the lens to obtain the finished, soft lens product. Suitable hydrophilic compositions include various hydroxyethylmethacrylate and N-vinyl pyrrolidone polymers, all of which are well-known in the art. Lathe cutting techniques for soft contact lenses are likewise well-known in the art. The present invention is accordingly directed to an improved lens configuration which may be utilized in conjunction with conventional polymer compositions and lens manufacturing techniques.

Turning now to FIG. 1, there is illustrated in plan view soft toric contact lens 10 which consists of central optical area 11, peripheral lenticular area 12, and crescent-shaped tapered-off area 13. A diagrammatic cross section of the lens of FIG. 1 through line 2—2 is shown in FIG. 2. The illustrated lens has a spherical base curve or convex inner surface including edge bevel 16 and an outer toric surface. FIG. 2 additionally shows by means of shaded area 14 the original prismatic base of the lens before cutting bevel 13 whereupon the material in shaded area 14 is removed to reduce the edge thickness of the lens in that region.

Referring again to FIG. 1, the orientation of the lens is indicated by reference to degrees as illustrated. The lenses illustrated and described herein are characterized by having the prism ballast centered at 270 degrees as indicated by the symbol Δ. The axis of the cylindrical correction is indicated by the reference symbol x. As illustrated in FIG. 1, the cylindrical axis of the lens is 90 degrees.

Referring now to FIG. 3, there is diagrammatic illustration of the edge thickness profile proceeding around the lens of FIG. 1 from A to A'. As a result of incorporating prismatic ballast into the lens, the thickness of the edge increases slightly in proceeding from A to B and from A' to B'. As a result of the present invention, however, edge thickness remains constant from B to B' over the tapered-off area of bevel 13. The original thickness profile of the lens prior to cutting bevel 13 is indicated by shaded area 15.

In FIG. 4, there is illustrated a soft toric contact lens similar to that of FIG. 1, but with the cylindrical axis at 45 degrees. Bevel area 23 in the lens of FIG. 4 is seen to shift in the direction of the cylindrical axis due to the increase in lens thickness along the cylindrical axis. The extent of the shift of bevel 23 is dependent upon the power of the cylindrical correction.

FIG. 5 is a diagrammatic cross section of the lens of FIG. 4 along line 5—5. In FIG. 5, the material removed from the ballast region of the lens as a result of cutting bevel 23 is illustrated by shaded area 24.

Referring now to FIG. 6, the edge thickness profile of the lens of FIG. 4 prior to cutting bevel 23 is indicated by shaded area 25. As a result of cutting bevel 23, edge thickness is reduced to a constant value over the span of the bevel from D to D'.

As illustrated in FIGS. 2 and 5, the tapered-off region of the lens is smoothly beveled from the outer surface of the lens along a crescent shaped line of demarcation and without creating any step or shoulder between the tapered-off region and the front surface of the lens.

In order to assure maximum comfort to the patient, the tapered-off area of the lens must extend radially into the lenticular area at least about 50 percent, and preferably about 75 percent. If the tapered-off area extends into the lenticular area less than about 50 percent, the angle of the bevel and/or edge thickness is increased to the discomforture of the user. If the tapered area extends more than about 75 percent into the lenticular area, patient comfort is not appreciably increased, and the mass of material removed diminishes the effectiveness of the prism ballast in stabilizing the orientation of the lens.

While lenses of the present invention are preferably fabricated as previously described by lathe cutting dehydrated buttons of a hydrophilic polymer, it will be appreciated that other materials and manufacturing techniques such as casting or molding of silicone lenses can also be employed to yield comparable soft toric contact lens. Other modifications or variations in the embodiment described and illustrated herein will be apparent to those skilled in the art and are accordingly within the scope of the present invention.

I claim:

1. A soft toric contact lens of spherocylindrical power having a concave inner surface, a convex outer surface, a horizontal axis and a vertical axis;
    said outer surface having a central optical zone and a peripheral lenticular zone;
    said lens including a prism ballast in the vertical axis, the degree of prism being from about 0.5 to 1.0 diopter;
    the outer surface of said lens having a smoothly beveled tapered-off region in the lenticular zone in the area of maximum ballast, the edge of said lens having a substantially uniform thickness in said tapered-off region.

2. The soft contact lens of claim 1 wherein said tapered off region is crescent-shaped.

3. The soft contact lens of claim 1 wherein said concave inner surface is spherical and said convex outer surface is toric.

4. The soft contact lens of claim 1 wherein the orientation of said spherocylindrical power is in the vertical axis, and said tapered-off region is crescent-shaped and symmetrical about said vertical axis.

5. The soft contact lens of claim 1 wherein the orientation of said spherocylindrical power is at an angle to the vertical axis, and said tapered-off region is crescent-shaped and nonsymmetrical about said vertical axis.

6. The soft contact lens of claim 1 wherein the degree of prism is about 0.75 diopters.

7. The soft contact lens of claim 1 wherein said tapered-off region extends radially at least about 50 percent into said lenticular zone.

8. The soft contact lens of claim 1 wherein said tapered-off region extends radially from about 50 percent to about 75 percent into said lenticular zone.

* * * * *